US012196573B1

(12) United States Patent
Patton et al.

(10) Patent No.: US 12,196,573 B1
(45) Date of Patent: Jan. 14, 2025

(54) COLLABORATIVE ROAD NETWORK ACCESS

(71) Applicant: Zoox, Inc., Foster City, CA (US)

(72) Inventors: Christopher Patton, Daly City, CA (US); Christopher James Gibson, Belmont, CA (US); Zachary Davis, Foster City, CA (US); Azeem Zaheer Ghumman, Canton, MI (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/555,186

(22) Filed: Dec. 17, 2021

(51) Int. Cl.
G06F 16/00 (2019.01)
G01C 21/00 (2006.01)
G06F 16/23 (2019.01)
G06F 16/29 (2019.01)

(52) U.S. Cl.
CPC ..... *G01C 21/3859* (2020.08); *G06F 16/2343* (2019.01); *G06F 16/29* (2019.01)

(58) Field of Classification Search
CPC .. G01C 21/3859; G06F 16/2343; G06F 16/29
See application file for complete search history.

(56) References Cited

U.S. PATENT DOCUMENTS

| 8,732,120 | B1 * | 5/2014 | Barreirinhas | ....... G06F 16/2343 707/608 |
|---|---|---|---|---|
| 2012/0209823 | A1 * | 8/2012 | Iwuchukwu | .......... G06F 16/235 707/704 |
| 2014/0046582 | A1 * | 2/2014 | Tijink | ................ G01C 21/3844 701/411 |
| 2018/0252536 | A1 * | 9/2018 | Dorum | ............... G01C 21/3673 |
| 2021/0199442 | A1 * | 7/2021 | Xie | ...................... G06V 20/588 |

FOREIGN PATENT DOCUMENTS

CN 112070861 A * 12/2020 ......... G06F 16/2343

* cited by examiner

*Primary Examiner* — Dinku W Gebresenbet
(74) *Attorney, Agent, or Firm* — EIP US LLP

(57) ABSTRACT

In examples, a method comprises receiving input from a first user relating to a first variable of a first portion of a road network, determining first semantic data associated with the first variable, determining the absence of a lock for the first portion based on the first semantic data, and causing a first lock to be implemented for the first portion based on the first semantic data. The first lock in examples indicates that users other than the first user are to be prevented from making changes to a first set of variables of the first portion that are associated with the first semantic data.

20 Claims, 9 Drawing Sheets

COLLABORATIVE ROAD NETWORK ACCESS

BACKGROUND

A map of a road network may be used by a navigation system to accurately guide a vehicle along the road network. The map may comprise data structures that are capable of providing information about the roads making up the road network. Information about the road network may include properties of the individual roads and features within them, intersections and relationships between roads, and other characteristics associated with the roads, such as zoning or areas that influence how the vehicle may be expected to operate. To allow the vehicle to continue to navigate the road network, the map may be kept up to date by one or more cartographers (or users who may annotate and/or update such maps).

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
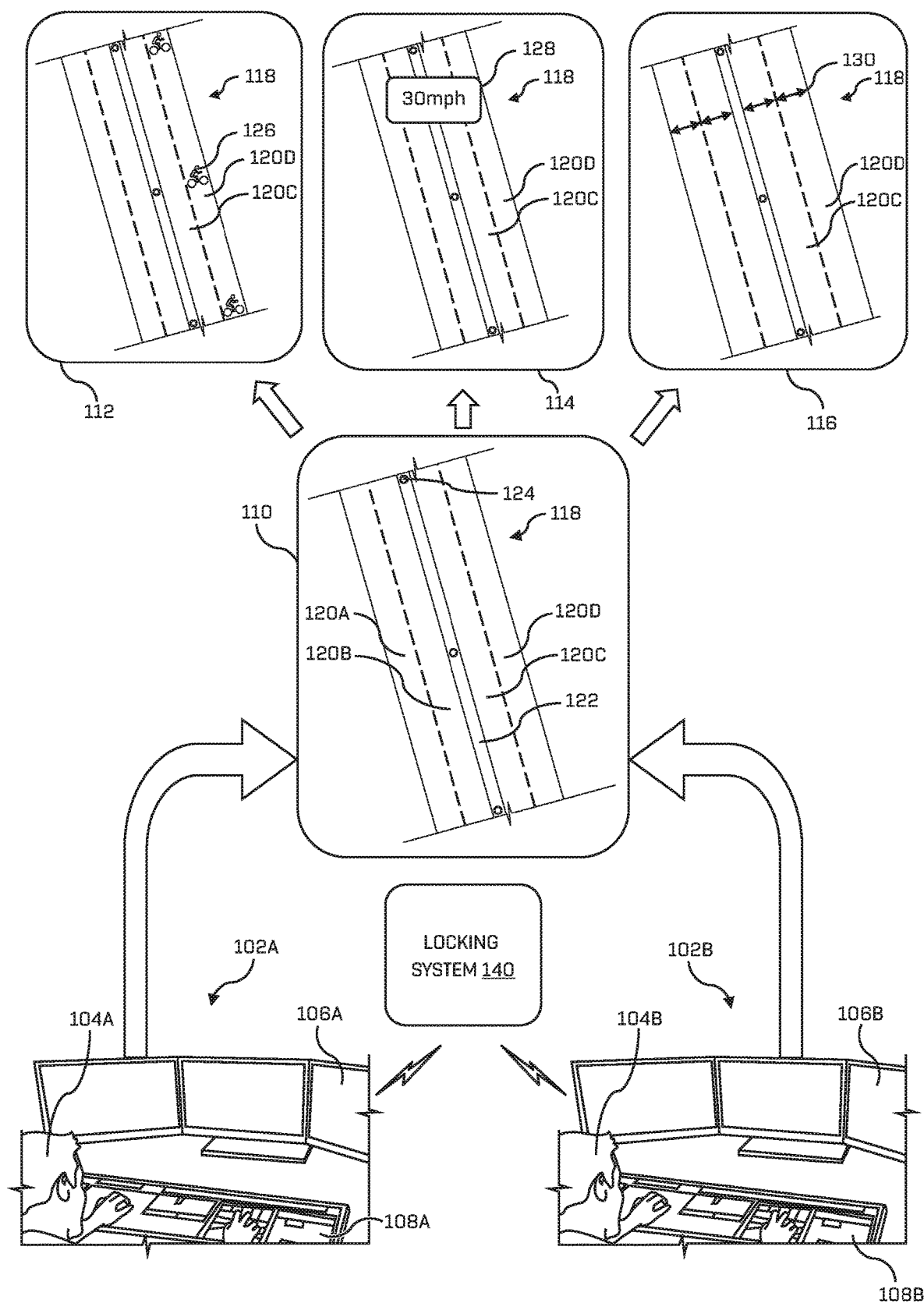
FIG. 1 is a pictorial diagram of collaborative road network access including semantic data.

This application relates to techniques, methods and systems for providing collaborative access to road network maps. Collaborative access may be defined as the ability for at least two users to work simultaneously or substantially simultaneously on the same map or portion thereof. Collaborative access may be achieved by balancing the proximity with which users can work relative to one another on the map with ensuring accuracy and precision when making changes to the map. In other words, collaborative access may be achieved by ensuring that users are able to work as closely and as simultaneously as possible within the map, while acting to prevent changes made by one user from being in conflict with changes made by other users, i.e. changes are made that are not compatible with one another when the changes are stored. Conflicts may occur when users make changes to the same part of the road network map (e.g., where two users simultaneously change features of a portion of a map in divergent ways; for example, a first user designating a road segment as having a speed limit of 15 mph while another designates the same segment as having a speed limit of 35 mph). It may also be useful to ensure that, in providing collaborative access, the ability of users to make changes to the map quickly and efficiently is not impeded by the software they are using.

The ability to work on proximate or the same regions of a map at the same or substantially the same time provides benefits in how efficiently the map may be updated. Furthermore, reducing the likelihood of conflicts while users are working collaboratively reduces the computing resources and time that may be required to resolve such conflicts. This is especially desirable in road network maps, where roads and road segments are arranged to intersect and form cyclic graphs, meaning that reducing conflicts reduces the likelihood of errors or mismatches in how the road network map is formed. Road network maps are important for vehicles travelling on a road network, to ensure that navigation systems are able to operate correctly. Updating a road network map quickly and efficiently, with reduced errors, may be useful for allowing a road network map to be delivered to a vehicle for use in navigation more quickly. Where the vehicle is an autonomous or semi-autonomous vehicle, this reduces the likelihood of the vehicle encountering roads or road segments that it cannot navigate.

Techniques that may be used to provide collaborative access to road network maps are described below. These techniques make use of so-called 'locks' to restrict access to particular portions of the road network while a user is working on that portion. A lock permits a particular user or group of users to make changes to the particular portion of the road network (and/or features associated therewith), and prevents users other than the permitted user or group of users from making changes. Implementing locks for particular users or groups of users reduces the likelihood of conflicts in changes made to the road network map. As described below, the techniques described herein involve dynamic implementation of locks to balance the proximity and accuracy with which users can collaborate. Dynamic implementation of locks may involve determining a lock to be implemented that is based on the change that a user wishes to make. In addition, the techniques may involve implementing a lock only where appropriate, and acting to avoid implementing the lock if possible.

Due to the complex semantic nature of such maps, it is possible to implement such locks such that multiple users may work on the same portion of the map without conflict. As a non-limiting example of such, a first user may modify the geometry associated with a lane (e.g., changing a radius of curvature) while another changes an associated speed limit, as the two changes do not conflict.

Where locks are implemented, they may be configured so that as small a part of the road network map as possible is covered by the lock. In examples, a lock may be implemented for a particular road segment, and, if possible, to a particular variable or set of variables of the particular road segment. This may be achieved using semantic data that links sets of related variables for each road segment. For example, variables relating to the dimensions of a road segment may be referred to as geometric variables, meaning that the semantic data associated with these variables is 'geometric' or a related term. Similarly, 'topological' and 'policy' variable sets may be defined, in which the variables relate to the arrangement and intersections of road segments and to details related to how a vehicle may operate on the road segment respectively. Using semantic data allows for grouping of variables for the purposes of locking, without requiring complex data processing to determine interactions between variables that might otherwise slow down how quickly and efficiently a user can make changes. Moreover, semantic data is easily understood by users, and provides a straightforward and understandable way of expressing why and how access to a particular road segment is restricted.

By using semantic data, sets of variables may be defined that are directly related to individual changes being made by the user. As described above, such a set of variables may be the variables associated with 'geometric' semantic data, such that when a user changes a variable associated with this semantic data, a lock is provided for all variables associated with the semantic data. The use of semantic data may also enable sets of variables to be defined that relate to combinations of changes by a user. In other words, while a variable may individually relate to a first piece of semantic data, such as the geometric data discussed earlier in this paragraph, the variable may also, in combination with one or more other variables, be considered to relate to other pieces of semantic data. Accordingly, when a user attempts to change a first variable, a lock may be issued for the semantic data directly relating to that variable, and when the user attempts to make changes to a second variable, a lock may be issued for semantic data directly relating to the second variable and/or to semantic data relating to the combination of the first and second variable. For example, as described above, a geometric variable may be considered to belong to the set of variables associated with 'geometric' semantic data. However, the variable may, if combined with another variable in, for example, a policy set of variables, be considered to be related to a different piece of semantic data that is not associated with each of the sets individually. In a non-limiting example, a geometric variable such as lane width and a policy variable such as lane type may relate to a combined semantic data of lane design. This use of combinatory semantic data and sets of variables allows greater flexibility and dynamicism. This is also useful example of how the techniques described herein pre-empt and predict what a user is expected to be attempting to change, allowing the user the freedom and case to make changes to particular sets of variables without encountering obstacles.

The use of the locks as described above and herein may also be used to provide collaborative access in specific situations, such as testing and development and/or in version control and branching.

These techniques for collaborative access in road network maps are in contrast to other systems and methods, where users are required to determine and agree, prior to carrying out changes, that there is not going to be a conflict. If there is a conflict, it subsequently has to be worked out by the two or more users who made the changes causing the conflict. Such techniques are resource- and time-intensive, as well as having a high likelihood for errors.

Other systems may use locks, but these locks are typically static. For example, a map may be subdivided into squares of a predetermined size, and locks may be applied to each square, rather than any specific segment. Road segments falling within the square, either wholly or partially, may then be locked. In other words, if a road segment of a road network is to be edited by a user, a lock is applied to the area in which that segment is located, along with any other road segments and features in that area. In other examples, a lock may be applied to whole road segments and any connecting roads, such that a user editing one road segment locks a plurality of other road segments that are associated with that segment, even if they are not editing those segments. In these examples, although a user may only be making a small change to a road segment that doesn't affect any of the neighboring road segments, such as changing a speed limit or a parking schedule, other users are prevented from making changes in the vicinity of the segment. This reduces the efficiency with which users can work and the speed with which updates to a road network map can be made and loaded onto a vehicle for use in navigation systems.

Implementation of collaborative access in this way improves the efficiency of operation of computing devices within a networked system provided for map editing, and particularly road network map editing. The computing resources required to resolve incompatibilities in changes are reduced, while ensuring continuing case of use for users. Furthermore, enabling up-to-date maps to be quickly and efficiently provided to a vehicle ensures that the vehicle is able to continue operating safely on a road network covered by the road network map.

FIG. 1 provides a pictorial representation of how collaborative access may be implemented. In FIG. 1, a first computing device 102A and a second computing device 102B are shown. The first and second computing devices 102A, 102B may be operated by a first user 104A and a second user 104B respectively. The first and second computing devices 102A, 102B may each have output devices 106A, 106B, here shown as three display devices, and input devices 108A, 108B, here shown as a keyboard and mouse. The first and second computing devices 102A, 102B may each further comprise one or more processors and a memory (not shown). The first and second computing devices 102A, 102B are described below in more detail in relation to FIGS. 2 and 3.

The first and second computing devices 102A, 102B may be operated by the first and second users 104A, 104B respectively to view and to edit a map of a road network. The road network may be displayed to the users 104A, 104B via the output devices 106A, 106B. The users 104A, 104B may provide input to the input devices 108A, 108B to interact with the road network. The users 104A, 104B may interact with the road network by requesting to view a portion of the road network, requesting to view data that is associated with the road network, or by requesting changes to the data that is associated with the network.

References to actions performed by the first user 104A and/or the second user 104B, and to users more generally in this application, should be considered to be references to actions performed by the respective computing devices operated by those users.

A road network map may comprise a plurality of elements. An element may comprise a road segment. Road segments may be connected together to form the map. An element may comprise a feature that connects to one or more road segments. For example, a junction may be an element that connects road segments. An element may comprise a feature that interacts with one or more road segments. An example of such an element may be an area annotation, such as a crosswalk. The relationships between elements, as well as the properties or features of individual elements or groups of elements are defined by data. The data may be arranged by one or more data structures. For example, each of the elements may be associated with a particular data structure that stores data relating to that element. Relationships between elements may be stored as data in one or more other data structures. Other data structures may be used to define semantic data, locks and permissions, and/or other features of the road network map such as the environment in which the elements are located. A road segment may be a portion of a road or a whole road. A road segment may be defined by its properties and may have the same properties along its length. A road segment may be defined between two intersections or two other features.

Although the examples provided in the following paragraphs refer to road segments, the techniques described are not limited to road segments and may be applicable to all elements of a road network map. Furthermore, the techniques may also be applied to portions of a road network map that comprise one or more elements.

The first and second computing devices 102A, 102B may be used by the first and second users 104A, 104B to access, view, and edit the road network map. The computing devices 102A, 120B may access the road network map or a copy of the road network map from memory, from a local server, or from a remote server. In order to enable collaborative access, a locking system 140 may be provided to implement locks for the road network map.

For clarity, FIG. 1 does not show the system for accessing the road network map and the locking system in detail. Example systems by which the road network map may be collaboratively accessed are shown in FIG. 2 and FIG. 3.

Figure 2:
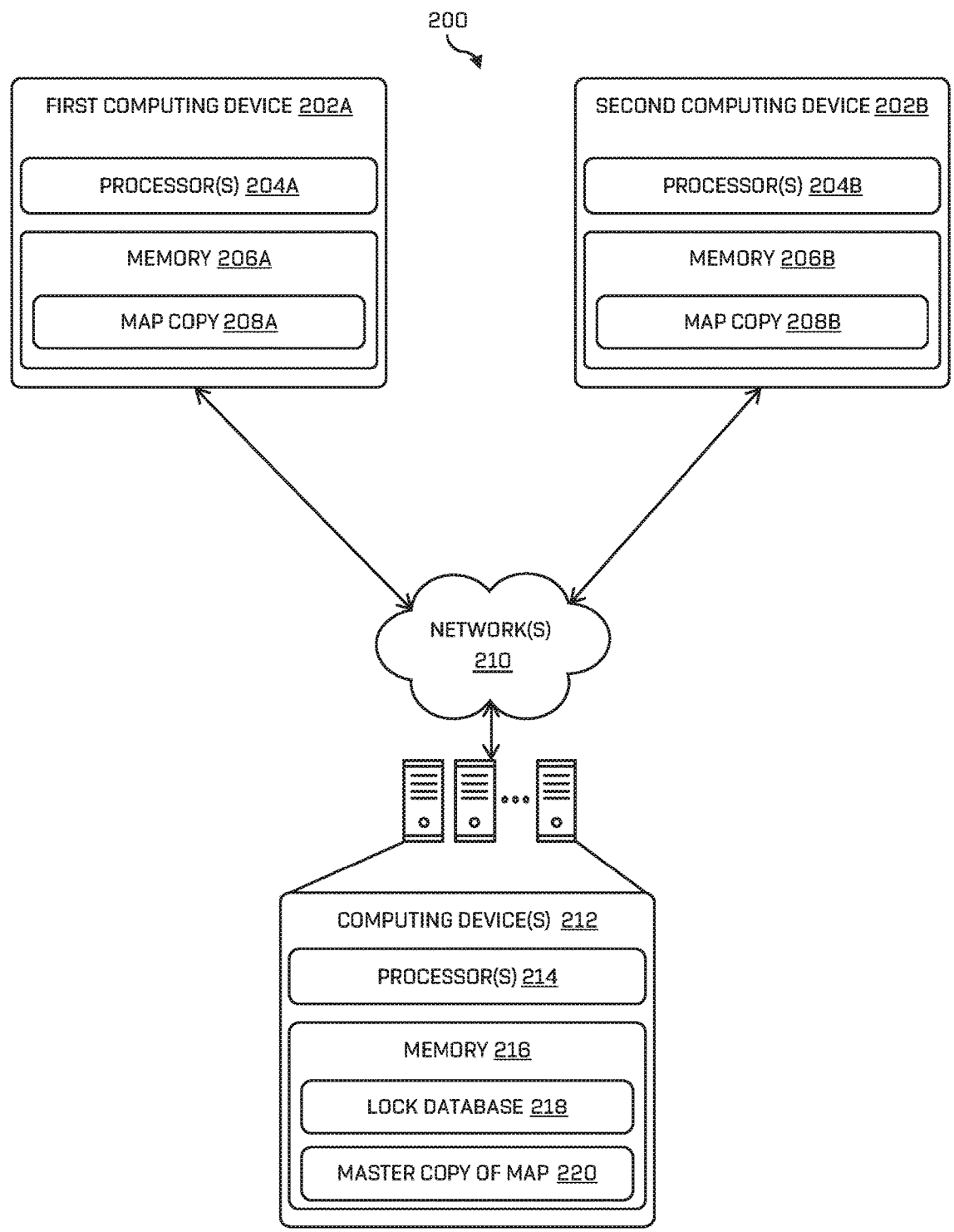
FIG. 2 is a block diagram illustrating an example computing system according to aspects of this disclosure.
Figure 3:
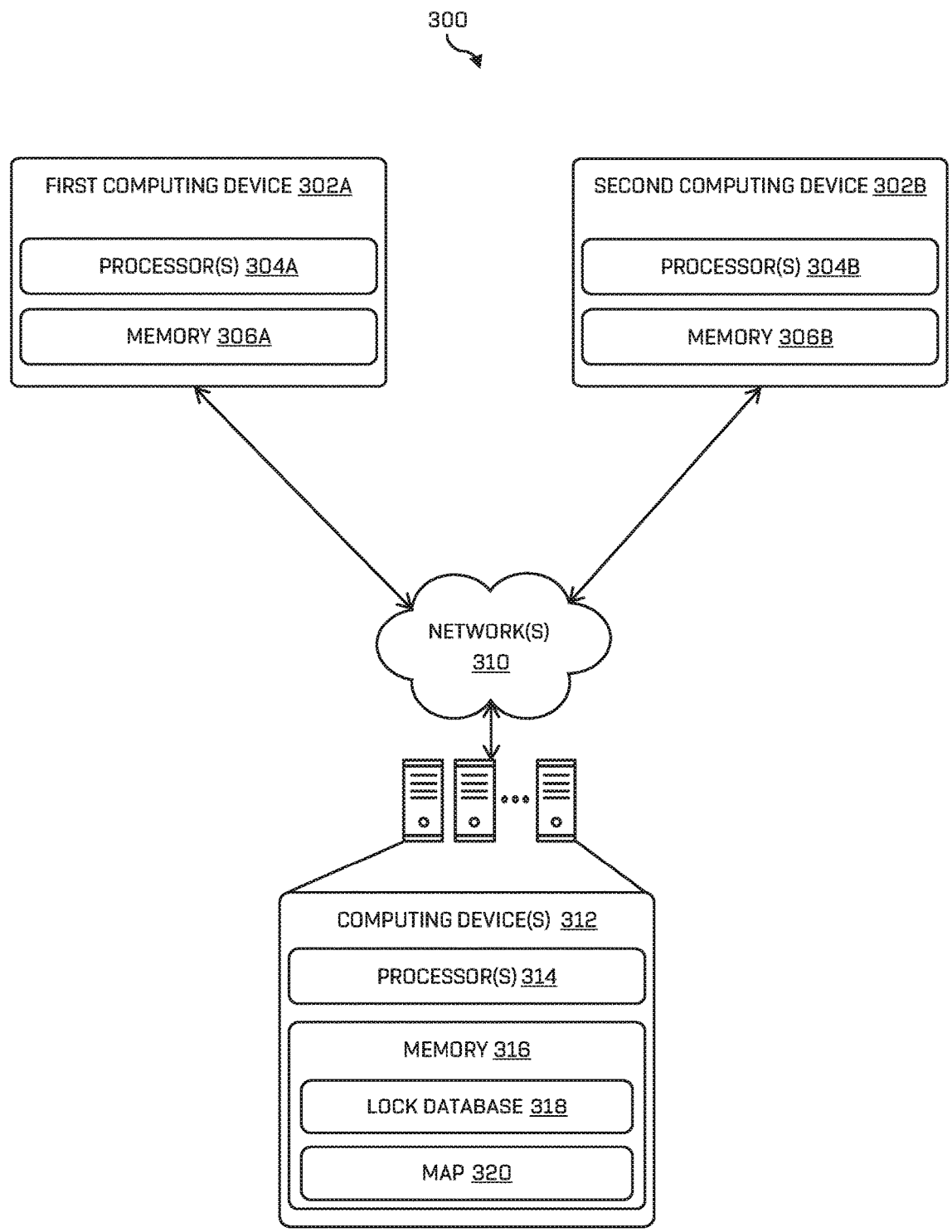
FIG. 3 is a block diagram illustrating another example computing system according to aspects of this disclosure.

FIG. 2 shows an example of a system 200 for collaborative access. The system 200 may comprise a first computing device 202A and a second computing device 202B. The first and second computing devices 202A and 202B may correspond to the first and second computing devices 102A and 102B of FIG. 1 and may be for use by respective users (not shown in FIG. 2). Each of the first and second computing devices 202A, 202B may comprise one or more processors 204A, 204B and a memory 206A, 206B. Of course, though depicted for illustrative reasons as comprising a first and second computing device, any number of computing devices (whether local, remote, or collocated with one another) are contemplated.

The system 200 may also comprise one or more further computing devices 212 that are separate from the first and second computing devices 202A, 202B. The first and second computing devices 202A, 202B may communicate with the one or more further computing devices 212 via a network 210. The one or more further computing devices 212 may also comprise one or more processors 214 and a memory 216. The one or more further computing devices 212 may comprise or correspond to the locking system 140 of FIG. 1.

In this example, each of the first and second computing devices 202A, 202B stores a local copy of a road network map 208A, 208B. The local copies 208A, 208B may comprise a part of the road network map. The parts stored by each of the first and second computing devices 202A, 202B may differ. The users of the first and second computing devices 202A, 202B may access the respective copies of the road network map 208A, 208B and view and edit the copies locally. Changes made to the respective copies of the road network map 208A, 208B may be merged together in a master copy of the map 220, stored in memory 216 of the one or more further computing devices 212.

Changes may be merged to the master copy 220 by communicating from each communication devices changes since a last merge or by returning updated data relating to the copy of the map that the computing device stores.

Although the copies of the road network map 208A, 208B are shown in FIG. 2 as being stored in the memories 206A, 206B of the first and second computing devices, in some examples, the copies may be stored in local servers or memories with which the first and second computing devices 202A, 202B are connected.

In order to avoid conflicts in edits made to the copies of the road network map 208A, 208B, the one or more further computing devices 212 may also store a lock database 218 as part of a locking system. The one or more further computing devices 212 may be configured to receive, from the first computing device 202A or second computing device 202B, input relating to road segments and variables of the road network map. The one or more further computing devices 212 may then determine whether changes to those road segments and the variables of those road segments may be made and/or may issue locks associated with the road segments and variables to each computing device 202A, 202B based on the lock database 218. The interaction between the computing devices 202A, 202B and the locking system and its database 218 will be described in more detail in relation to FIG. 1 and FIGS. 4 to 8 below.

Although the lock database 218 and master copy of the map 220 are shown as stored in the same memory in this depiction, in other examples, the lock database 218 and master copy of the map 220 may be stored in memories of separate computing devices.

In some non-limiting examples, the first and second computing devices 202A, 202B may also store a local lock database (not shown in FIG. 2). The local lock databases of the first and second computing devices 202A, 202B may store locks associated with the copies of the road network map 208A, 208B stored by each device. In examples where the copies of the road network map 208A, 208B comprise part of the wider road network map, the locks stored in the local lock databases may be specific to the part of the network map found in the copies. In some examples, the local lock database may store locks associated with the computing device on which it is stored, or with the user of that computing device. As will be described below, storing locks that have been granted to a computing device or its user locally may reduce the number of communications between the computing device and the remote servers storing the central locking system.

In the example of FIG. 2, users are therefore provided with a copy of the road network map 208A, 208B, and are granted read access to a part of the road network map or the entire road network map based on the copy of the road network map 208A, 208B. As will be described below, in relation to FIGS. 4 to 8, write access for elements, segments, or portions of the road network map may be granted using locks.

FIG. 3 shows an alternative system 300 to the system 200 of FIG. 2. The system 300 may comprise a first computing device 302A and a second computing device 302B. The first and second computing devices 302A and 302B may correspond to the first and second computing devices 102A and 102B of FIG. 1 and may be for use by respective users (not shown in FIG. 2). Each of the first and second computing devices 302A, 302B may comprise one or more processors 304A, 304B and a memory 306A, 306B.

The system 300 may also comprise one or more further computing devices 312 that are separate from the first and second computing devices 302A, 302B. The first and second computing devices 302A, 302B may communicate with the one or more further computing devices 312 via a network 310. The one or more further computing devices 312 may also comprise one or more processors 314 and a memory 316. The one or more further computing devices 312 may comprise or correspond to the locking system 140 of FIG. 1.

Instead of storing a copy of the map locally, in the system 300, each of the first and second computing devices 302A, 302B may be configured to work collaboratively on a centralized map 320 stored at the further computing device 312. The first and second computing devices 302A. 302B, may access the map 320 via a network 310. The further computing device 312 may also store a lock database 318 as part of a locking system, as is also described in relation to FIG. 2 and the lock database 218. As described in relation to FIG. 2, although shown in the same memory 316 in FIG. 3, the lock database 318 and map 320 may, alternatively, be stored in memories of separate computing devices. Returning to FIG. 1, a scenario is shown in which, initially, the first and second users 104A, 104B access a portion of the road network map. The portion of the road network map may be displayed to the users 104A, 104B as shown in box 110. The users 104A, 104B may access the portion simultaneously or substantially simultaneously. Alternatively, the second user 104B may access the portion at a later point in time than the first user 104A but while the first user 104A is still working on that portion of the road network map.

The portion shown in box 110 includes a road segment 118. The road segment 118 comprises four lanes 120A, 120B, 120C, 120D, with two lanes either side of a central divider 122. The road segment 118 is defined based on three control points 124.

For clarity, only a single road segment 118 is shown and described in FIG. 1, but it will be appreciated that the road segment 118 may connect to other road segments of the road network map at either of its ends or along its length. The other road segments may be displayed to users via the computing devices as appropriate.

At a first point in time, the first user 104A may view the road segment 118. The first user 104A may desire to make a change to the road segment 118. The change may be to change the lane type of lane 120D. The user 104A may wish to change the lane 120D from a driving lane, in which motor vehicles are allowed to drive, to a bicycle lane, in which only bicycles may travel. A representation of this is shown in box 112, where the lane 120D of the road segment 118 now has bicycle indicators 126 along its length.

In order to make this change, the first user 104A provides input to the first computing device 102A. The input may comprise an indication of the road segment 118. For example, road segment 118 may have an associated identifier and the user 104A may provide the identifier of the road segment 118. In other examples, the user 104A may select the road segment 118 on their display 106A using the input device 108A. The input may also comprise an indication of a variable that the user 104A wishes to change. In the example of FIG. 1 and as shown in box 112, this variable is the lane type. The input may optionally also include the value to which the user 104A wishes to change the variable, or, for numerical variables, a change value, i.e., how much the value should be changed by. In the example of FIG. 1, this value would be an indication of a bicycle lane.

The input to the first computing device 102A by the user 104A may be communicated by the first computing device 102A to the locking system 140 prior to any change to the map being made. The locking system 140 may be configured to perform a process to cause a lock to be implemented for the road segment 118 for the variable or a set of variables including the variable identified in the input. The locking system 140 may also identify whether a lock is already present that prevents the user 104A from making the change.

Figure 4:
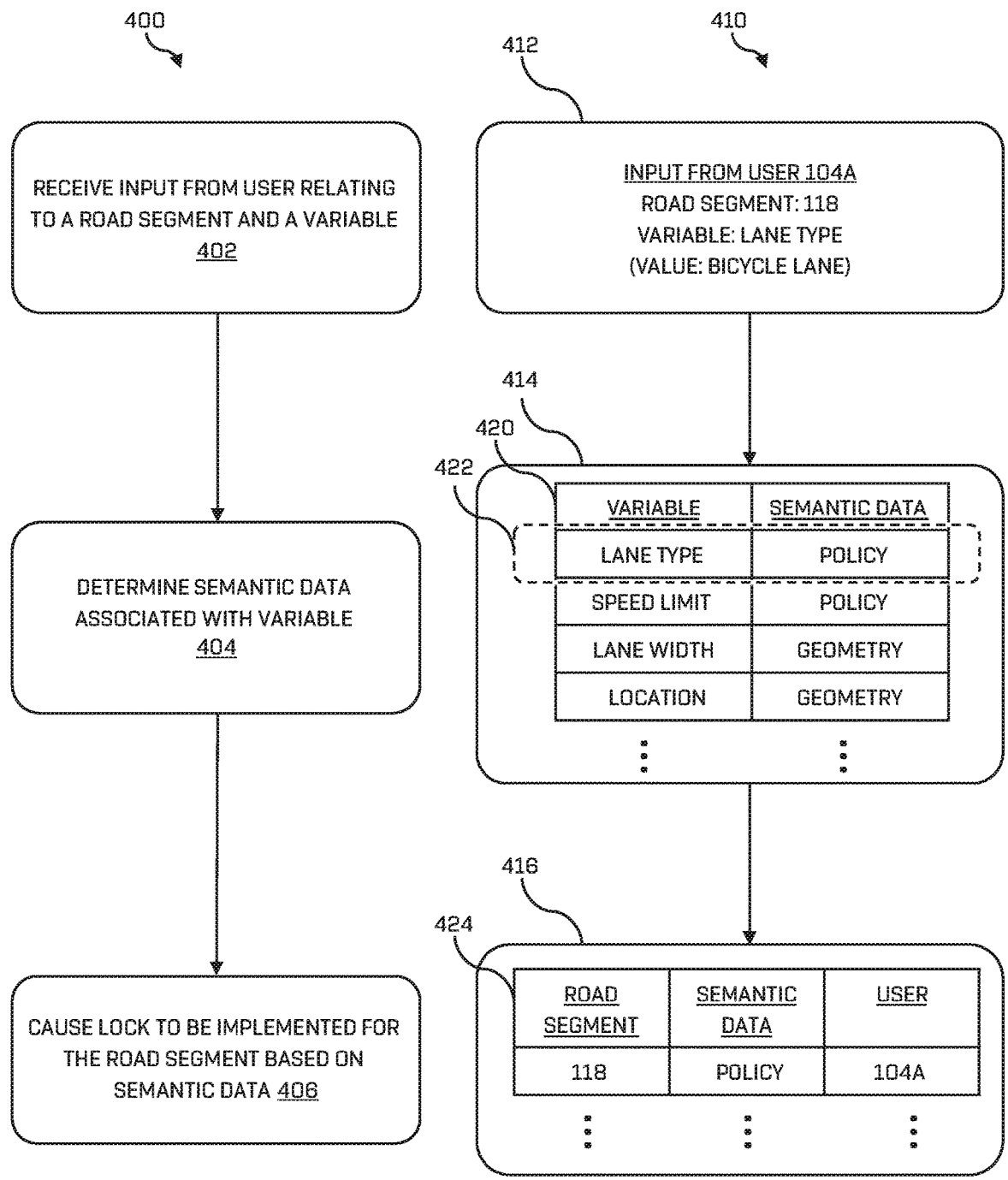
FIG. 4 includes textual and visual flow charts that illustrate example methods for issuing a lock to a user for editing a road segment of a road network, according to aspects of this disclosure.

The process of implementing the lock is shown in FIG. 4. On the left-hand side, FIG. 4 shows a textual flow chart 400 of a method for implementing a lock. The method 400 may be performed by a locking system such as locking system 140. In some examples, some or all of the method 400 may be performed locally on a computing device of the user such as first computing device 202A. On the right-hand side of FIG. 4, there is provided a corresponding visual flow chart 410 that provides visual examples of the steps performed in the textual flow chart 400. The visual examples include examples of how data may be used to implement locks.

In the flow chart 400, the locking system 140 initially, at step 402 receives input from the user relating to a road segment and a variable. At step 404, the locking system 140 may be configured to determine semantic data associated with the variable, based on the input received from the user at step 402. Having determined semantic data at step 404, the locking system 140 may be configured, at step 406, to cause a lock to be implemented for the variable of the road segment based on the semantic data. A lock prevents changes from being made by computing devices and/or users to the specific road segment and variables associated with the semantic data other than the computing device and/or user to which the lock was granted. The lock also permits the user and/or computing device to which the lock was granted to make changes to the road segment based on the semantic data.

Following the method 400, one or more changes may be stored, and the map may be provided to a vehicle. The vehicle may perform one or more operations based on the map.

In some examples, one or more locks may be predetermined. In some examples, one or more locks may have been specified for the road network map so that they can be assigned to a user upon request. For example, locks may be specified for the road network map for three types of semantic data, and when a user attempts to edit that semantic data, such a lock may be applied.

In some examples, locks may be dependent upon the user and/or computing device from which the input is received. For example, some users may be prevented from making changes to portions of a map (e.g., by a user having administrative privileges). In another example, one or more users may be prevented from making changes to one or more variables. Accordingly, locks may be issued based on data relating to the user or the computing device. In this way, permissions for editing a road network map may be integrated with a locking system.

In some examples, locks may be provided to users on a first-come-first-serve basis, in which a user requesting a lock is issued the lock if it has not already been issued. In some examples, locks may be allocated on a hierarchical basis, such that one or more users has preferential access to a lock. In these examples, a lock may be removed from a first user with a lower level of access, so that the first user is prevented from making or merging changes based on the lock, if a change is requested or if the lock is cancelled by another user with a higher level of access.

Hierarchies may also be implemented for locks, by implementing locks that change depending upon what is requested. For example, a lock may be granted for a particular variable, semantic data, a region of a map, for a particular set of users, or a combination of these, depending on a defined hierarchy of locks.

In some examples, locks may be turned on and off (i.e. granted/issued and revoked) depending on the actions of the user to which the lock was granted. For example, if, after making the change, the user merges the changes or attempts to make other changes, the lock may be revoked to permit continued collaborative access and to prevent other users from being blocked from making changes to the road element, segment, or portion of the network. In some examples, a user may indicate that they have finished using the lock and the lock may then be revoked. In some examples, a lock may be revoked after a predetermined period of time has elapsed. The predetermined period of time may depend upon the user, the lock, the road segment for which the lock was granted, or a time since a last change or merge.

In some examples, different types of lock may be issued. A different type of lock may be issued depending on the user or computing device from which input was received, the variable, the road segment or element, and/or the semantic data. For example, a lock may be issued that prevents other users from making changes to the variables associated with the semantic data and that allows changes to be made to the local copy stored at a computing device. Such a lock may require further validation once changes are to be merged. Other locks may provide permission to a user to make changes and to merge changes without further validation.

In some examples, a lock may be issued that allows a group of users associated with the user requesting the lock to make one or more changes while prohibiting other groups of users. In some examples, a lock may be issued for a group of users that specifies semantic data, a portion of the map, or one or more variables. Such a lock may prohibit other users from making changes while also requiring the users of the group for which the lock was issued to take a further lock for a smaller portion of the map, a subset of variables, or for particular semantic data. In other words, a lock may be issued that prevents other users from making changes but that does not allow the users for which the lock was issued to make changes to the map, instead requiring sub-locks or further permissions to make changes within the original lock.

Turning to the flow chart 410 which visually represents these steps, in box 412, which corresponds to step 402, input is received from the first user 104A. The input may comprise an indication of the road segment, in this case using the reference numeral already provided, 118, the variable which is lane type, and, optionally, as represented by the parentheses, the value to which the first user 104A wishes to change the variable. The input may be received by the locking system 140 in a message communicated to the locking system 140 from the first computing device 102A via a network, such as network 210.

Box 414 corresponds to step 404 in which semantic data is determined. In box 414, a look-up table 420 indicating correspondence between variables and their semantic data is displayed. As shown in the table 420, the variable 'lane type' has associated semantic data 'policy'. Also shown are the variables 'speed limit', 'lane width', and 'location'. Speed limit is also associated with the semantic data 'policy', while lane width and location are associated with the semantic data 'geometry'.

In other words, lane type, i.e. what the lane of the road segment is to be used for, may be classified as part of a set of variables relating to policy associated with the road. The semantic data 'policy' may be associated with other variables that govern how the road is used by vehicles. For example, other variables associated with the semantic data 'policy' may include speed limit, as shown in box 414, as well as direction of travel, schedule of road use, permissions for using the road, etc., may be associated with 'policy'. Variables relating to the road segment for use within the road network map may also be classified using the 'policy' semantic data.

The semantic data 'geometry' is also shown in the table 420 of box 414. In box 414, these include lane width and location of the road segment, which may correspond to a coordinate of a control point such as control point 124 of the road segment 118. Other variable associated with the semantic data 'geometry' may comprise number of lanes associated with the road segment, the location of the lanes relative to the center of the road, a curvature of the road or of one or more lanes, or a tangent that defines or partially defines curvature associated with the road segment. Other geometry variables may comprise boundaries or borders associated with a road segment or element, border interpolation parameters, or changes of a variable over time such as for example lane width.

Although not shown in table 420 of box 414, other variables may be associated with other semantic data. A particular example is 'topology' semantic data. Variables associated with the semantic data 'topology' may include one or more connecting road segment associated with the road segment, a relationship with each of the one or more connecting road segments, a start point associated with the road segment, an end point associated with the road segment. Other variables associated with the semantic data may include permitted routes between road segments, such as when a right turn is permitted or not permitted, or where a particular box or junction is required to be used when turning.

In other examples, 'topography' semantic data may also be associated with one or more variables, relating to the elevation, positions, and relative positions of features in the map. Geometric, topological, or policy semantic data may be associated with other road elements. For example, where the element is an area annotation, geometric semantic data may comprise a location of the area annotation or an orientation of the area annotation. Policy semantic data may include whether the area annotation is explicitly shown on the road or whether it is implied by the road. Topological semantic data may comprise an association or relationship with other elements, and particularly with a road segment.

As shown in the table 420, semantic data may comprise a descriptor or label associated with one or more variables, and this descriptor or label may be associated with the variable in the table 420. In some embodiments, the semantic data may comprise an identifier or other data that is shared by one or more variables of a set of variables that are semantically linked. In general, therefore, semantic data may comprise data associated with a semantic link between one or more variables. The semantic data may be generated based on associations between the variables. The associations may be determined manually or may be based on processing techniques, such as natural language processing (NLP) of the variables.

For example, the 'policy' semantic data shown in FIG. 4 may alternatively be represented by the identifier '1' or any other identifier. However, the term 'policy' and the identifier '1' in these examples both represent a semantic link between variables that are assigned that semantic data, and that link is, in this example, variables that govern the operation of vehicles on the road segment.

In box 414, the semantic data is determined based on a table 420 providing associations between the variables. In some examples, this table 420 may be stored at the locking system 140. In other examples, the table 420 may be stored at a separate computing device. In some examples, semantic data for each variable may be stored for each individual road segment or for a group of road segments, or may be provided in metadata associated with the road network map.

From the table 420, the locking system may determine the semantic data associated with the variable lane type to be 'policy' as indicated by the dashed box 422.

Box 416 corresponds to step 406. In box 416 there is shown a table 424 that links road segments, semantic data, and users for implementing a lock. The table 424 may be an example of what is stored in a lock database, such as lock database 218, of a locking system. Locks may also or alternatively be granted to specific computing devices rather than or in addition to users. In this table 424, a new entry has been created corresponding to road segment 118 for which the input was received. The entry in table 424 links the road segment 118 together with the semantic data 'policy' and the user 104A. Accordingly, a lock is now granted to the user 104A for the road segment 118 and variables that are associated with the semantic data 'policy'. The user 104A may now be permitted to make changes, such as the change of the lane type to bicycle lane as desired, whilst all other users may be prevented from making changes to variables associated with the semantic data 'policy' for the road segment 118. The lock may be granted until the user 104A indicates that the lock is no longer required, until a certain time period has elapsed, or until the user performs a particular action, such as deselecting the road segment in the road network map. A length of time for which the lock is granted and/or has been held may also be stored in the table 424.

Although a new entry is created in table 424 in the example of box 416, in other examples a table comprising entries for each road segment may already be populated, and flags or other indicators may be set that implement locks for specific users or computing devices.

Although table 424 shows that a lock is granted to a particular user and this association is used to determine whether other users can make changes, in some examples the lock may be associated with users who are not permitted to make changes to the road segment or based on the semantic data. In other words, locks may be associated with specific users that indicate what the user is prohibited from changing.

In some examples, rather than a locking database, a user database may be provided, in which data is stored indicating which locks are associated with which users.

In some examples, a lock may include or be associated with a radius to changes, such that changes within a predetermined distance from the road segment or portion of the map for which the lock is issued are prevented.

The process after step 406 may differ depending on what input was received from the user at step 402. In some examples, the input comprises an indication of a road segment and of the variable to be changed but may not include the change to be made. In these examples, the input may comprise a request for a lock to be issued for the road segment based on the input. For this scenario, once the lock is granted, the user may request for changes to be made. The changes may be made with further reference to the locking system, in which the first computing device communicates further input to the locking system, identifying the road segment, variable, and change. The locking system may be configured to consult a table such as table 424 to determine if the user is permitted to edit the road segment, as per the request, and may allow the change to be made based on determining that the user is permitted to edit the road segment. Alternatively, where each computing device stores or is associated with a copy of the road network map, such as in the example system of FIG. 2, the lock may be propagated from the locking system to the individual devices, with each device implementing locks when a user wishes to make a change.

In other examples, the input received at step 402 may comprise the change to be made. In these examples, the change may be made once the lock is granted without further input from the locking system. In the system of FIG. 2, this may comprise the locking system, as part of the one or more further computing devices 212, communicating confirmation that the lock is granted back to the first computing device 202A, for example, which subsequently makes the change to the copy of the road network map 208A stored at that device. In the system of FIG. 3, this may comprise the locking system, as part of the one or more further computing devices 312, passing the input to the processor 314 or confirming that the change may be made to the processor 314, which subsequently implemented the change in the map 320 stored in the memory 316.

Although not shown in FIG. 4, a further optional step may be incorporated between steps 404 and 406 in which the locking system performs a check based on the semantic data to determine whether a lock already exists for the road segment and the semantic data associated with the variable designated in the input. If a lock is already present, then the first user may be prevented from making changes and a lock may not be granted. If no lock is present, then a lock may be granted and the first user may be permitted to make the changes to the road segment. These mechanisms are described in more detail below in relation to FIG. 5 and FIG. 6. The flow chart of FIG. 7 may also be applied before step 404 or before step 406, as is described in more detail below.

Returning to FIG. 1, the first user 104A, having requested to change the lane type of lane 120D of road segment 118 has been granted a lock by the locking system 140 as described in relation to FIG. 4 above, and may now change the lane type of lane 120D to a bicycle lane. The first user 104A may also make changes to other variables that are associated with the 'policy' semantic data while the lock is implemented.

After the lock is granted, the second user 104B may wish to make changes to the road segment 118. The road segment 118 may be displayed to the user 104B at the computing device 106B as shown in box 110, as the change by the first user 104A to what is shown in box 112 may not have been saved in the map or merged with other changes to the map yet. The second user 104B may attempt to change the speed limit of the road segment 118. The speed limit change desired by the user 104B is represented in box 114, in which the speed limit 128 is now 30 mph, and has changed from an earlier value that was different to 30 mph.

However, in this example, speed limit is a variable that is associated with other variables by the 'policy' descriptor, as was seen above in table 420 of FIG. 4. The variables having the descriptor 'policy' as their semantic data are subject to a lock for the road segment 118. The lock is granted to the user 104A, not the user 104B. Accordingly, when consulting the locking system 140 and attempting to make the change shown in box 114, the second user 104B may be prevented from making the change at the computing device 102B because of the lock already granted to the first user 104A.

Figure 5:
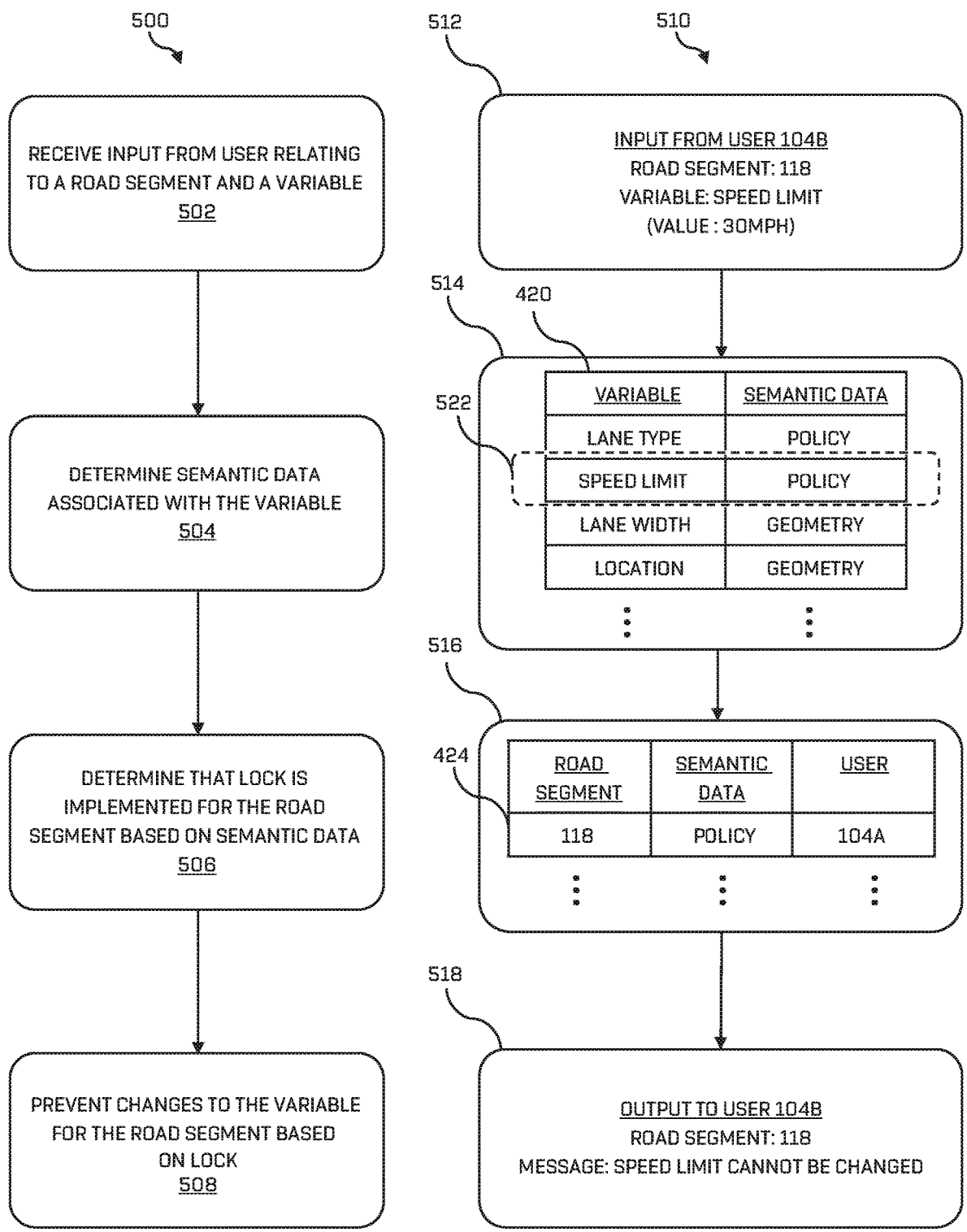
FIG. 5 includes textual and visual flow charts that illustrate example methods for using a lock to prevent a user from editing a road segment of a road network, according to aspects of this disclosure.

To explain in more detail, FIG. 5 shows a textual flow chart 500 and visual flow chart 510. The textual flow chart 500 in FIG. 5 shows a general method governing how a second user may be prevented from making changes based on a lock granted to a first user. The visual flow chart 510 provides an example corresponding to each step of the textual flow chart 500.

In the textual flow chart 500 of FIG. 5, at step 502, input may be received from a user relating to a road segment and a variable. As in FIG. 4, at step 504, semantic data may be determined based on the input. At step 506, based on the determined semantic data, a check is made to determine if a lock is already in place for the road segment for the semantic data. It may be determined, based on the semantic data that a lock is implemented for the road segment in the input received at step 502 and for the semantic data determined at step 504 but that it is not associated with the user identified in the input. Consequently, it may be determined that the user from whom the input was received should be prevented from making changes to variables associated with the semantic data, and particularly, that the requested change in the input cannot be allowed. Instead of granting a lock as in FIG. 4, therefore, the changes are prevented at step 508.

As shown in the visual flow chart 510, in box 512, which corresponds to step 502, the input may be, for example, from the second user 104B and may relate to the road segment 118 for which the lock was granted to the first user 104A in FIG. 4. As shown in box 512, the second user 104B may provide input that indicates that a change to the variable 'Speed Limit' is desired, and, optionally, that the value to change to is '30 mph'.

As show in box 514, corresponding to step 504, it is determined from the table 420 that the variable speed limit, identified in the input at step 502, has associated semantic data of 'policy', as indicated by the box 522.

As in step 506, it is subsequently determined whether a lock is implemented. This may be done with reference to table 424, as shown in box 516, which corresponds to step 506. The entry generated in FIG. 4 granting the lock to the first user 104A for the road segment 118 and policy semantic data is present in table 424. Therefore, the locking system determines that a lock is already implemented for the road segment based on the semantic data but not to the user identified in the input received at step 502, box 512.

As shown in box 518, which corresponds to step 508, a message may subsequently be returned to the computing device 102B used by the user 104B to indicate that the variable 'Speed Limit' cannot be changed. The message may also indicate that a lock is already issued for that road segment 118 to the first user 104A.

Thus, using the methods described in FIG. 4 and FIG. 5, conflicts are avoided by implementing locks for variables that are related by semantic data. Accordingly, users may make changes to specific road segments and particular sets of variables without the possibility that their changes may be in conflict with other users. Users may also be informed or understand why they are unable to make changes as requested.

Returning to FIG. 1, the second user 104B, having been prevented from making the change shown in box 114, may decide to instead change the width of the lanes 120A-120D of the road segment 118. A representation of this is shown in box 116, with the lane widths labelled with arrows 130.

As before, when attempting to implement this change at the second computing device 102B, input may be provided to the locking system 140 to check if the second user 104B is permitted to make this change. This process is shown in more detail in FIG. 6.

Figure 6:
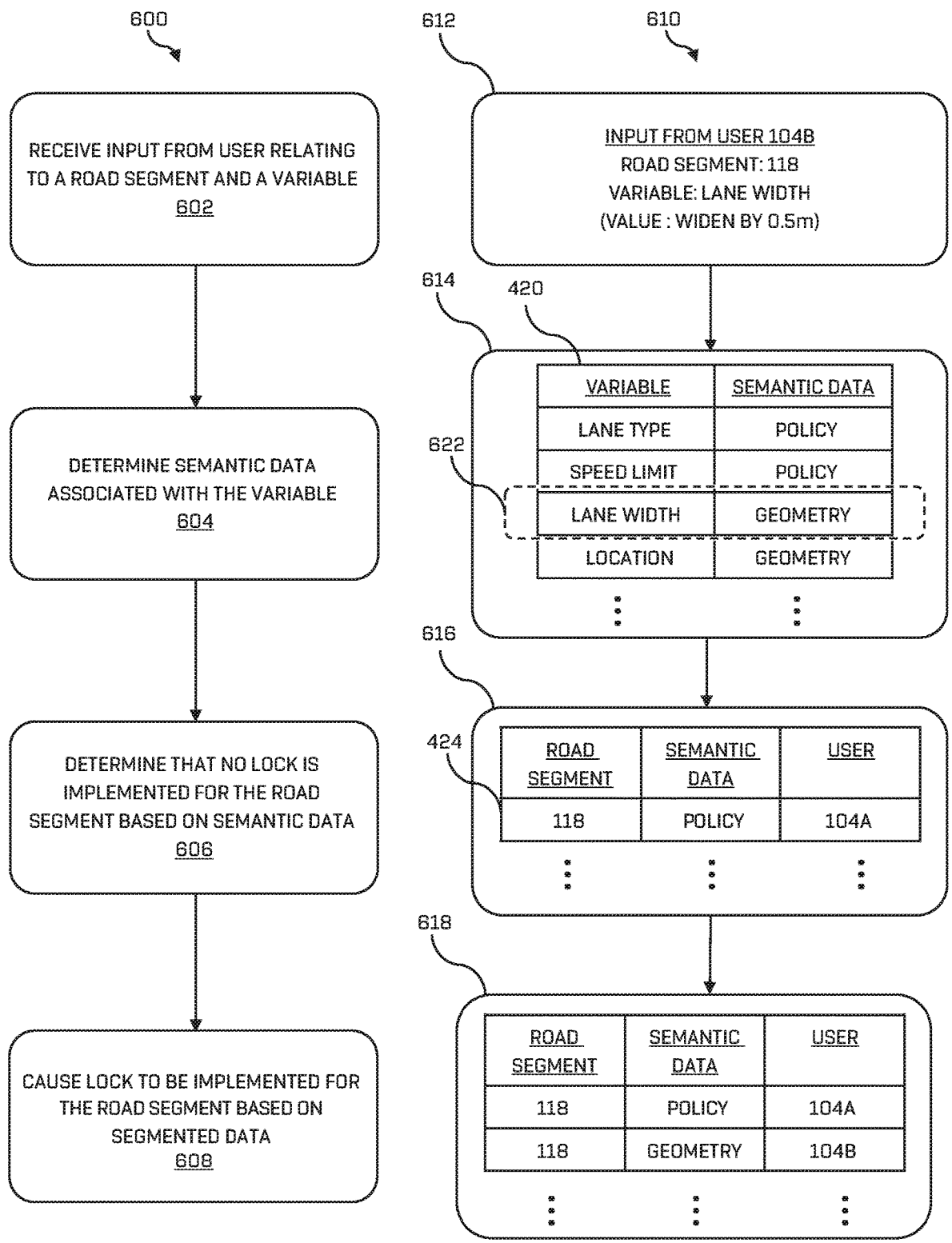
FIG. 6 includes textual and visual flow charts that illustrate example methods for allowing collaborative access to a road segment for two users, according to aspects of this disclosure.

FIG. 6 shows a textual flow chart 600 governing the general method performed by a locking system, such as locking system 140, on the left-hand side and a corresponding visual flow chart 610 in which examples of the data determined or handled by the locking system are displayed.

At step 602 of the flow chart 600, input may be received from a user. Based on the input, semantic data may be determined at step 604 of the flow chart 600, the semantic data being associated with the variable. At step 606 of the flow chart 600, a check may be performed to determine whether a lock has been issued already for the road segment based on the semantic data. The check may identify that there is no lock for the road segment based on the semantic data. At step 608, because no lock is currently implemented for the road segment, based on the determination at step 606, a new lock may be implemented or caused to be implemented for the road segment based on the semantic data.

In the corresponding visual flow chart, at box 612, which corresponds to step 602, the input is received from the second user 104B and relates to the road segment 118. Instead of attempting to change speed limit, with this input the user 104B wishes to change the variable 'Lane Width' as described above in relation to FIG. 1. As shown in box 612, the input may optionally include a value, which in this example is to widen the lanes by 0.5 m.

As in step 604, semantic data is determined. In the example in the flow chart 610, at box 614, the table 420 indicates that the semantic data associated with the variable is 'geometry'. This means that the variable 'Lane Width' is grouped into a set of variables relating to the geometry of the road segment.

Next, as shown in box 616, which corresponds to step 606, the semantic data and road segment are used to determine if a lock exists already or whether a lock can be granted. In box 616, it is shown in the table 424 of the lock database that the road segment 118 has a lock for user 104A for variables associated with the 'policy' semantic data. However, there is no corresponding lock in the table 424 for the semantic data 'geometry' for road segment 118.

Accordingly, because no lock exists for the road segment for the semantic data 'geometry, a lock may be granted and implemented for this segment, data, and user. As shown in box 618, which corresponds to step 608, a new entry has been made in the table 424 for the road segment 118, the semantic data 'geometry', and the user 104B. This entry corresponds to a new lock, which will be implemented when the table 424 is subsequently consulted at a later point in time.

Accordingly, the second user 104B is now granted a lock to make changes to the road segment 118 for variables that have the associated semantic data 'geometry'. In other words, as shown in table 420, the second user 104B may make changes to variables such as lane width or location, or other variables that are associated with the 'geometry' semantic data. However, the second user is prevented from making changes to variables of the road segment 118 associated with the 'policy' semantic data, because a lock is granted for this semantic data to a different user, i.e. the first user 104A.

Similarly, the first user 104A is now granted a lock to make changes to the road segment 118 for variables that have the associated semantic data 'policy', but is prevented from making changes to the road segment for variables associated with the semantic data 'geometry'. In other words, as shown in table 420, the first user 104A may make changes to variables such as lane type or speed limit, or other variables that are associated with the 'policy' semantic data.

Thus, collaborative access to the road network map is achieved because both the first and second user 104A, 104B, are now permitted to make changes to the road segment 118 without introducing conflicts when the changes are subsequently stored. By implementing locks to specific groups of interrelated variables, determined based on semantic association, large restrictions to portions of the map are avoided and users can work in proximity to each other relative to the map.

Although not shown in FIG. 6, the locking system 140 may also be configured to grant a lock to the second user 104B for other road segments associated with the road segment 118. As the second user 104B has been granted a lock for the geometry semantic data and can now make changes to variables associated with that semantic data, changes to the road segment 118 by the second user 104B may cause a conflict with other road segments, such as those that directly intersect with the road segment 118 at least, if a change is not propagated to the other road segments. As an example, if the user changes the lane width of the road segment 118, but does not change the lane widths of the road segments that connect to the road segment 118 at either end, there may be a mismatch between the widths of the road segments. Accordingly, the locking system 140 may determine, a further road segment that connects to the road segment for which the lock is implemented. The locking system 140 may cause a further lock to be implemented for the further road segment based on the semantic data. In other words, the lock on the connecting road segments may also be implemented for geometry. The locking system 104 may be configured to determine a plurality of connecting road segments by traversing the road segments or otherwise analyzing data associated with the road segments and their interconnections. The locking system may grant a lock for geometry semantic data for each of these road segments. This ensures that the second user 104B is able to make the necessary changes to the road segments to avoid conflicts when the changes are stored but still permits changes to be made by other users to variables not associated with the semantic data for which the lock is issued.

This may be implemented using one or more validation processes. When a user attempts to make a change based on a lock, such as in the process of FIG. 6, a validation process may be performed based on the road segment to which the change is to be applied, and based on one or more connecting road segments. A conflict may be determined by the validation process between the first road segment and the second road segment due to the requested change and based on the variable and/or the semantic data associated with that variable. The user may be prevented from making the change based on the validation process. The user may be requested to make the same change to the connecting road segment, and may be issued with a lock to ensure that the user is able to make the change to the connecting road segment.

A step such as step 606 may also be performed between steps 404 and 406 of the flow chart 400 of FIG. 4, to check whether there is already a lock for the road segment. In other examples, such as that of FIG. 4, there may be no locks implemented for the road segment at the point at which the locking system checks for locks. In the example of FIG. 6 and FIG. 1, the existing lock for the road segment 118 and policy semantic data is shown to demonstrate how multiple users may collaborate on a single road segment using the techniques described herein.

In some examples, it is desirable to avoid locks being issued altogether. Accordingly, in some examples, the locking system 140 or another computing device may determine whether a change requested to be made to a road segment is smaller than a threshold or fulfils particular criteria. If the change is considered to be small enough that no lock needs to be granted, then the change may be made without granting a lock.

Figure 7:
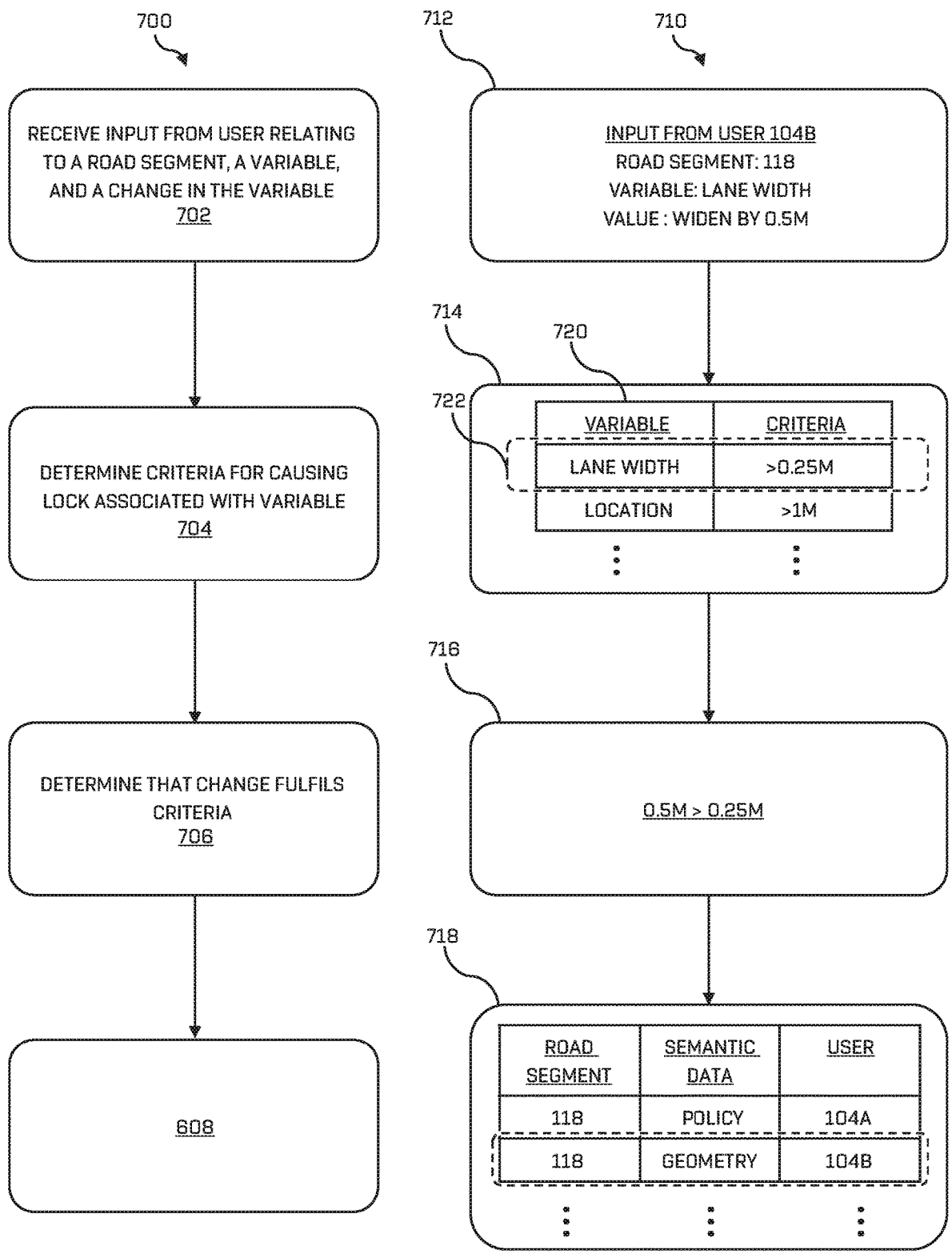
FIG. 7 includes textual and visual flow charts that illustrate example methods for determining whether a lock is to be issued to a user, according to aspects of this disclosure.

An example of this is depicted in the textual flow chart 700 and the visual flow chart 710 of FIG. 7. In the textual flow chart 700, at step 702, input may be received from a user. The input may relate to a road segment, a variable, and the change to be made to the variable of the road segment. The change may comprise a value by which the variable is to be changed or a new value to which the variable is to be changed. At step 704, a predetermined criterion associated with the variable may be determined. The predetermined criterion may specify a threshold value above which a lock is required, or may specify a threshold value below which a lock is not required. The criterion may specify a change value. At step 706 it may be determined whether the change specified in the input fulfils the criterion, i.e. is above or below the threshold value. If the change fulfils the criterion, a lock may be required, so some or all of the steps of, for example, FIG. 6 or FIG. 4 may be performed to grant a lock. These steps are represented by the reference numeral 608 in FIG. 7. If the change does not fulfil the criterion, a lock is not required, and the change may be made without a lock being granted, provided that a lock does not already exist for the semantic data associated with the variable.

In this example, where a change value fulfils the predetermined criterion a lock is required. In other examples, the change value fulfilling the predetermined criterion may correspond to a lock not being required.

In the visual flow chart 710 an example of input that may be received at step 702 is shown at box 712. The input, in this example, is the same input as received in FIG. 6. The input is received from the second user 104B, and comprises an indication of road segment 118, an indication of the variable 'Lane Width', and a change value, corresponding to a widening of 0.5 m. The change value in the input may comprise the direct instruction to widen by 0.5 m, or may comprise a new value such as 2.5 m and the system may determine that this corresponds to a widening of 0.5 m based on the original value for the lane width being 2 m.

In box 714, a criterion associated with the lane width is determined, as per step 704. In this example, the criterion specifies that changes in the lane width that are greater than 0.25 m require a lock. In other words, changes to lane width smaller than or equal to 0.25 m do not require a lock.

In box 716, which corresponds to step 706, it is determined that the value in the input for the change fulfils the criterion and therefore a lock is required. Subsequently, in box 718, which corresponds to the steps of methods FIG. 4 or FIG. 6, a lock is issued for the road segment based on the semantic data associated with the variable.

As also shown in box 714, changes to a location of the road segment of greater than 1 m also require a lock. In some examples, criteria may relate to a combination of variables, such as, in this example, location or position of the road segment or of a control point of the road segment. The criterion may specify a maximum change above which a lock is required, wherein the maximum change is based on an absolute change in location, rather than on individual coordinates. For example, while a change in a first coordinate and a second coordinate may be below the threshold set by the criterion, the combined change in location based on the first and second coordinate may be above the threshold and may therefore require a lock.

Although FIG. 7 uses a numeric value as an example of a criterion, in some examples the criterion may be a type of change. For example, if the variable were lane type, lane type changes between two different lane types in which all vehicles are permitted to drive may not require a lock, while changes between lane types that change which vehicles are permitted to drive in that lane may require a lock.

In the examples described in relation to FIGS. 4 to 7, each variable is associated with semantic data and a lock is implemented based on the semantic data when the user wishes to change the variable. In some examples, a lock may be implemented based on combined semantic data, when a user makes changes to a particular combination of variables rather than just individual variables. In these examples, locks may still be implemented based on the individual variables. In addition, a lock may be implemented for semantic data associated with the combination so that further variables are subject to a lock. An example of this is shown in FIG. 8.

Figure 8:
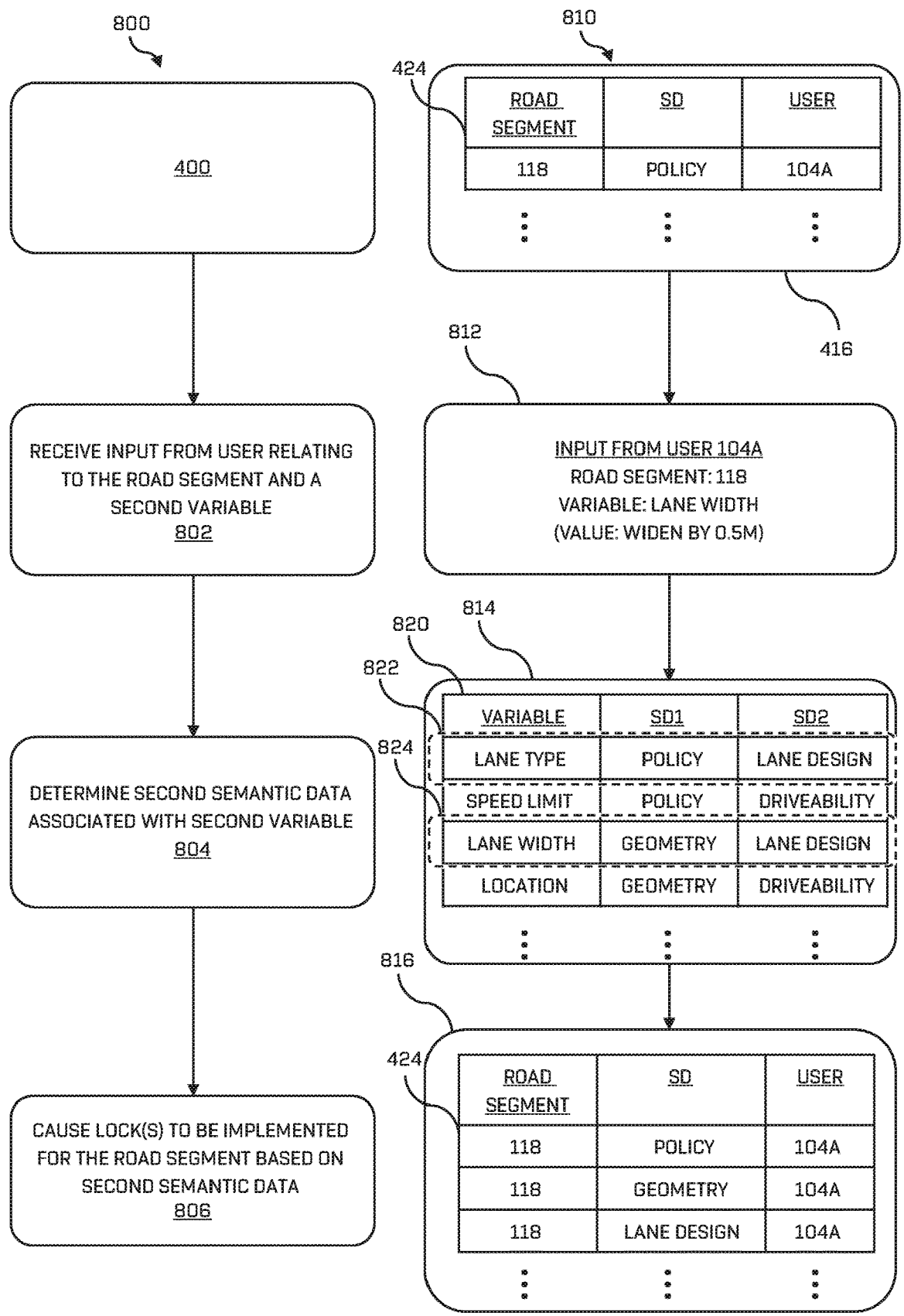
FIG. 8 includes textual and visual flow charts that illustrate example methods for issuing a lock to a user for editing a road segment of a road network, according to aspects of this disclosure.

FIG. 8 shows a textual flow chart 800 showing a general method of granting two or more locks to a user and a corresponding visual flow diagram 810 showing examples of the steps of the textual flow chart 800.

At a first step in the textual flow chart 800, the process shown in the textual flow chart 400 of FIG. 4 is performed. Accordingly, a lock has already been granted to a user for a road segment based on semantic data associated with a first variable. At step 802, further input, relating to a second variable for the road segment, may be received from the user. The second variable may be a variable that is not associated with the semantic data for which a lock was granted in the process 400. At step 804, second semantic data associated with the second variable may be determined based on the input. The second semantic data, as will be explained below, may comprise semantic data associated with the second variable but not the first variable, and/or may comprise semantic data shared between the second variable and the first variable. At step 806, one or more locks are implemented based on the second semantic data. Accordingly, the user is granted at least two locks, based on the variables that they desire to change.

Turning to the visual flow diagram 810, as shown in box 416, from the process 400, the first user 104A has been granted a lock for road segment 118 based on 'policy' semantic data. Subsequently, input is received from the user, according to 802, an example of which is shown in box 812. As can be seen in box 812, the new input from the first user 104A to whom the lock was granted for policy semantic data corresponds to the same road segment 118, but to a different variable 'Lane Width'. As previously shown in earlier examples, lane width and lane type have different semantic data, with lane width having 'geometry' as its associated semantic data and lane type having 'policy' as its associated semantic data.

However, when lane width and lane type are changed together, it is recognized that the user may be working on the design of the lanes. This may be recognized in the system, by including further semantic data associated with each variable that ties other sets of variables together. This is recognized by the inclusion of further semantic data, relating to combinations of variables. This is shown in table 820 in box 814. In this table 820, there are three columns: a first column labelled 'variable', a second column labelled 'SD1', and a third column labelled 'SD2'. The columns 'variable' and 'SD1' are the same columns as found in table 420 under the labels 'variable' and 'semantic data'. In the new column, 'SD2', semantic data is shown associated with each variable for the purpose of implementing a lock when two or more of the variables having that semantic data are changed or attempted to be changed by a user.

Accordingly, based on the user's input from box 812 and the user's earlier input from box 402, the lane type and lane width are identified, as indicated using boxes 822 and 824. These two boxes have variables in the column SD1 that are policy and geometry, and are therefore unrelated. Accordingly, a lock may be implemented for both these. As shown earlier in FIG. 8, a lock is already implemented for policy, so a new lock is implemented for geometry, providing a lock has not already been granted to other users. An example of this is shown in box 816, in which a new entry is provided in the table 424 of the lock database for road segment 118 and a lock for semantic data geometry issued to user 104A.

However, as there are two variables being changed, the column SD2 may also be referred to, to determine if there is any shared semantic data. As shown in this column in the table 820 of the box 814, lane type and lane width are both associated with the semantic data 'lane design' in column SD2. Also shown in table 820 are the variables speed limit and location, which, despite having different semantic data in column SD1 also share semantic data in column SD2 of 'drivability'.

As there is shared semantic data between the lane type and lane width, a lock may be determined for the semantic data 'lane design' for road segment 118 and user 104A, as shown in table 424 of box 816.

Although the process of FIG. 8 describes that the input from the user relating to the second variable is received after the first variable, in some examples they may be received together.

In some examples, the semantic data shared by the two variables identified in the user's input may encompass one or both of the sets of variables associated with the semantic data of the individual variables. In other words, in some examples, the semantic data 'lane design' may be associated with a set of variables that encompasses all variables in the set of variables associated with the 'policy' or 'geometry' semantic data.

In some examples, semantic data associated with one variable may relate to a set of variables that includes the variables of another set related to other semantic data. Accordingly, when input relating to a second variable is received, a lock may be granted for the set of variables having semantic data associated with the second variable, and that set may include the set of variables for which a lock has already been implemented. In other words, the first variable may form part of a set of first variables and a set of second variables, and the set of second variables may include all the variables of the first set of variables.

In some examples, a variable may be part of two sets of variables, each set being associated with different semantic data. In order to allow as much collaborative access as possible, the semantic data may be determined for each set. The set of variables that has the smallest number of variables in it may be chosen for implementing a lock, and a lock may be implemented based on the determination, such that the lock is based on the semantic data for which the number variables is fewest.

The use of locking as described in relation to FIGS. 1 to 8 above may provide particular advantages when applied to specific systems and situations. For example, the locking system and methods described above may be applied to branching in a revision control system. An example of this is described below in relation to FIG. 9A, FIG. 9B, and FIG. 9C.

Figure 9A:
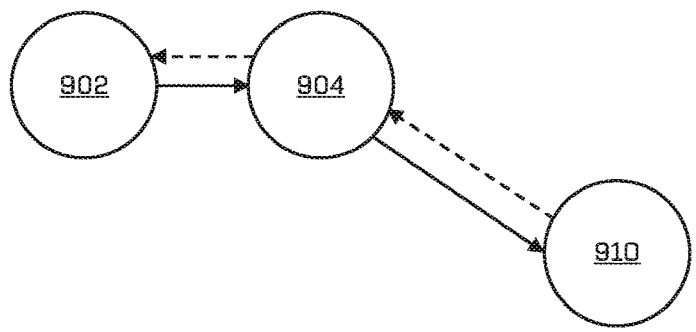
FIGS. 9A to 9C is a schematic diagram illustrating branching in a revision control system according to aspects of this disclosure.
Figure 9B:
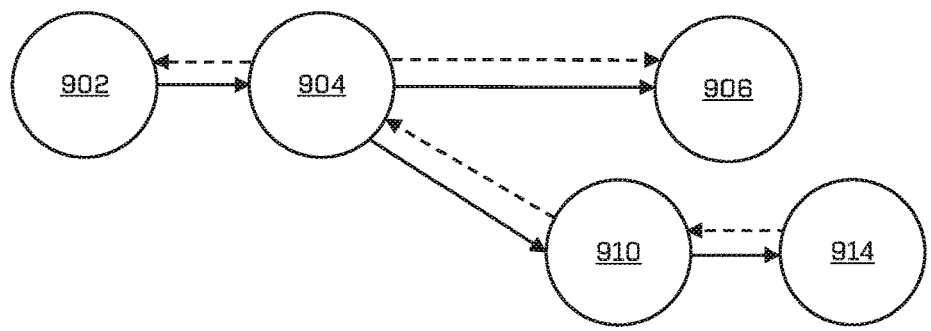
Figure 9C:
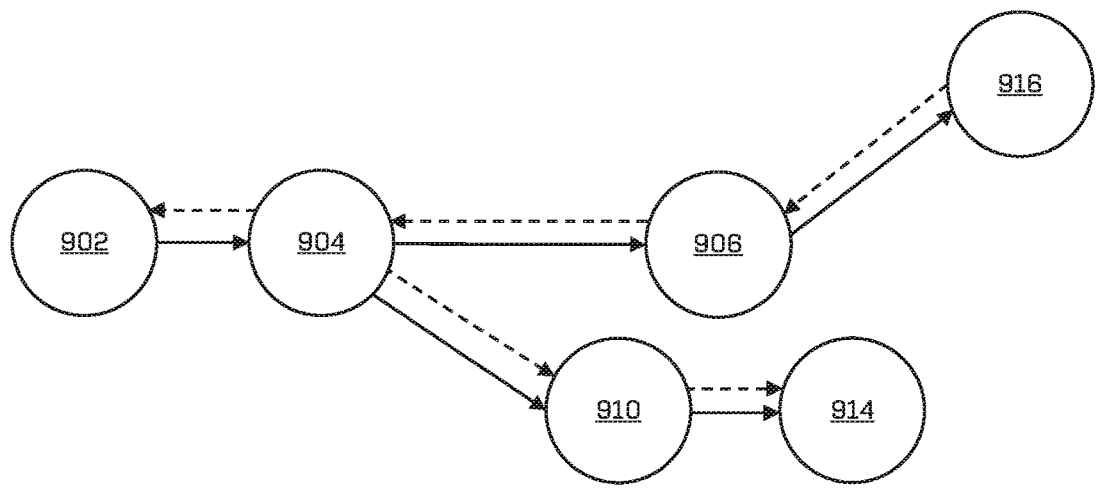

Each of FIG. 9A, FIG. 9B, and FIG. 9C show a point in time. FIG. 9A shows a first point in time, FIG. 9B shows a second point in time after the first point in time and FIG. 9C shows a third point in time after the second point in time. Points in time may refer to particular timestamps. Events leading up to the points in time are shown in each of FIGS. 9A, 9B, and 9C as circles such as 902 and 904, with time increasing from left to right. The circles represent events, which may comprise a revision or the creation of a branch. Context for each will be provided below. The events may be associated with a particular timestamp.

In FIG. 9A, a trunk is shown by events 902 and 904. Events 902 and 904 represent revisions to the road network map by one or more users. Revisions represent points at which changes were stored to memory.

At the time shown in FIG. 9A, a first branch has been created from the trunk, as illustrated by event 910. A branch may be created to enable testing and development of a road network map. In some examples, a branch may be created to allow a project to be undertaken in relation to a portion of the map. For example, it may be necessary to make changes to a significant portion of a map to improve the case of use of the map for users. Accordingly, a user or group of users may create a branch in which a portion of the map is reserved for the project. This may be implemented by creating a branch in which revisions may be made and subsequently merged, and obtaining a lock for the portion of the map on which the user is working. In such an example, the initial lock, obtained at event 910, may be obtained for a region or portion of the map and for semantic data associated with one or more variables.

In order to ensure that revisions to the map by users not working on the branch do not interfere with the subsequent merging of changes from the branch, the lock obtained at event 910 may be propagated back through the revisions on the trunk. As indicated by the dashed lines in FIG. 9A, the lock obtained at event 910 is propagated to revision 904 and back to revision 902. Accordingly, until the lock is removed, branches or revisions created based on the road network map as at revisions 902 or 904 will inherit the lock obtained at event 910, even though they exist on the trunk or on a different branch of the road network map.

FIG. 9B shows a next point in time, at which a further revision 906 has been made on the trunk after the event 910, and a further revision 914 has been made on the branch after the revision 906 and the event 910. At revision 914 on the branch stemming from event 910, a further lock is obtained. Revision 914 also inherits the lock from event 910, because it exists on the same branch as event 910. The lock at revision 914 may be a separate lock to the lock obtained at event 910 or may be a sub-lock that sits within the purview of the lock created at event 910. Where the lock at revision 914 is outside the purview of the lock created at event 910, this may be propagated back to the event 910 and to revisions 904 and 902, as well as forward to revision 906, as shown in FIG. 9B. If the lock is a sub-lock, then back-propagation to event 910 only is required, such that any further branches from event 910 are subject to the sub-lock.

FIG. 9C shows a further event 916 that creates a different branch from the trunk based on revision 906. Event 916 is subjected to the locks created at events 910 and 914, and creates a new lock. The new lock is also propagated back along the trunk. The new lock created at event 916 also propagates along any branches from the trunk, such as the branch containing events 910 and 914. Accordingly, revisions on the branch containing events 910 and 914 cannot be in conflict with the lock formed by the event 916. The locks may persist until the branch for which the locks were created is merged with the trunk and any changes are merged into the road network map.

To enable the locks to be propagated, an indication of a lock for a particular event may be associated with a timestamp for the event. In some examples, a copy of a lock may be stored with each an indication of the event. There may be provided a data structure for each event or for each branch, whereby indications of locks that are propagated along the branches and trunks may be stored responsive to the propagation. Locks may be stored in such a data structure with an associated timestamp. Events and locks may be ordered based on their associated timestamps.

Accordingly, in general there may be provided methods and processes performed in a revision control system. In these methods, various steps may be performed including creating a branch from a trunk corresponding to a road network map, implementing a lock on the branch, propagating the lock along the branch to the trunk and to any other branches from the trunk. Locks may be removed once the branch is merged with the trunk. These features may be implemented using any of the systems described above and with the flow charts described above. Accordingly, locking for collaborative access may be implemented for road network maps. Particularly, semantic data may be used to implement locks for branching in revision control systems. This is particularly useful in ensuring that users operating on other branches or on the main trunk are not prevented from making changes unnecessarily, because the use of semantic data acts to reduce the amount of the map that cannot be edited by other users. When branching and revision systems are combined with the techniques described above, changes to a road network map for testing and development can be made while continuing to allow access for other users of the road network map, thereby further providing collaborative access in a useful way.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might." unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

EXAMPLE CLAUSES

A: A system comprising: one or more processors configured to: receive a first message from a first computing device, the first message comprising data indicating a road segment of the road network map and a first property of the road segment that to be changed; determine, based on the first message, a first semantic description associated with the first property; determine, based at least in part on the first semantic description, an absence of a previous lock associated with the road segment; store an indication that a first lock is granted to the first computing device for the road segment based on the first semantic description, the first lock permitting changes to be made by the first computing device to properties of the road segment associated with the first semantic description and preventing changes from being made by other computing devices connected to the server other than the first computing device to properties of the road segment associated with the first semantic description; and transmit a return message to the first computing system indicating that the change is permitted and that the first lock is granted.

B: A system as clause A describes, wherein the one or more processors are further configured to: receive a second message from a second computing device, the second message comprising data indicating the road segment of the road network map and an additional change to the first property of the road segment; determine, based on the second message, the first semantic description; determine that the first lock is granted to the first computing device for the road segment based on the first semantic description; and transmit, to the second computing device, a return message indicating that the change is prohibited.

C: A system as clause A or clause B describe, wherein the one or more processors are further configured to: receive a second message from a second computing device, the second message comprising data indicating the road segment of the road network map and a change to a second property of the road segment; determine, based on the second property, a second semantic description associated with the second property and which differs from the first semantic description; determine the absence of a lock associated with the road segment and the second semantic description; store an indication that a second lock is granted to the second computing device for the road segment based on the second semantic description, the second lock permitting changes to be made by the second computing device to properties of the road segment associated with the second semantic description and preventing changes from being made by other computing devices connected to the server to properties of the road segment associated with the second semantic description; and transmit a return message to the second computing system indicating that the change is permitted and that the second lock is granted.

D: A system as any of clauses A to C describe, wherein the semantic description comprises one or more of: a geometric label; a topological label; or a policy label.

E: A system as clause D describes, wherein the geometric label is associated with properties of the road segment comprising one or more of a coordinate of a control point, a lane width, a number of lanes, a curvature, or a tangent, the topological label is associated with properties of the road segment comprising or more of a connecting road segment, a relationship with another road segment, a start point, or an end point, or the policy label is associated with properties of the road segment comprising one or more of a speed limit, a direction of travel of a lane, a type of lane, a schedule, an association with a road element other than the road segment, a permitted vehicle indicator, a validation status, or an access indicator.

F: A method comprising: receiving input from a first user relating to a first variable of a first portion of a road network; determining first semantic data associated with the first variable; determining the absence of a lock for the first portion based on the first semantic data; and causing a first lock to be implemented for the first portion based on the first semantic data, wherein the first lock indicates that users other than the first user are to be prevented from making changes to a first set of variables of the first portion that are associated with the first semantic data.

G: A method as clause F describes, comprising: receiving input from a second user relating to the first variable of the first portion; determining the first semantic data associated with the first variable based on the input from the second user; determining that the first lock is implemented for the first portion based on the first semantic data; and preventing the second user from making a change to the first variable based on determining that the first lock is implemented for the first portion based on the first semantic data.

H: A method as any of clause F or clause G describes, comprising: receiving input from the first user relating to a second variable of the first portion; determining second semantic data associated with the second variable based on the input from the first user relating to the second variable, wherein the semantic data associated with the second variable is different from the semantic data associated with the first variable; determining the absence of a lock for the first portion based on the second semantic data; and causing a second lock to be implemented for the first portion based on the second semantic data, wherein the second lock indicates that users other than the first user are to be prevented from making changes to a second set of variables of the first portion that are associated with the second semantic data.

I: A method as clause H describes, comprising: determining third semantic data associated with the first variable and the second variable based on the input from the user relating to the first variable and the input from the user relating to the second variable, wherein the third semantic data is different from the first semantic data and the second semantic data; determining the absence of a lock for the first portion based on the third semantic data; and causing a third lock to be implemented for the first portion based on the third semantic data, wherein the third lock indicates that users other than the first user are to be prevented from making changes to a third set of variables of the first portion that are associated with the third semantic data, the third set of variables including the first variable and the second variable.

J: A method as any of clauses F to I describe, comprising: making a change to the first variable of the first portion in a copy of the road network map at a first computing device associated with the first user based on the input; and storing the change at a remote computing device connected to the first computing device and a second computing device associated with a second user.

K: A method as any of clauses F to J describe, comprising: receiving, at a remote computing device connected to a first computing device associated with a first user and a second computing device associated with a second user, a value from the first computing device for changing the first variable of the first portion; and changing, at the remote computing device, the first variable of the first portion in the road network map based on the value.

L: One or more non-transitory computer-readable media storing instructions executable by one or more processors, wherein the instructions, when executed, cause the one or more processors to perform operations comprising: receiving input from a first user relating to a first variable of a first portion of a road network; determining first semantic data associated with the first variable; and causing a first lock to be implemented for the first portion based on the first semantic data, wherein the first lock indicates that users other than the first user are to be prevented from making changes to a first set of variables of the first portion that are associated with the first semantic data.

M: One or more non-transitory computer-readable media as clause L describes, wherein the instructions cause the one or more processors to perform operations comprising: receiving input from a second user relating to the first variable of the first portion; determining the first semantic data associated with the first variable based on the input from the second user; determining that the first lock is implemented for the first portion based on the first semantic data; and preventing the second user from making a change to the first variable based on determining that the first lock is implemented for the first portion based on the first semantic data.

N: One or more non-transitory computer-readable media as clause L or clause M describes, wherein the instructions cause the one or more processors to perform operations comprising: receiving input from the first user relating to a second variable of the first portion; determining second semantic data associated with the second variable based on the input from the first user relating to the second variable, wherein the semantic data associated with the second variable is different from the semantic data associated with the first variable; and causing a second lock to be implemented for the first portion based on the second semantic data, wherein the second lock indicates that users other than the first user are to be prevented from making changes to a second set of variables of the first portion that are associated with the second semantic data.

O: One or more non-transitory computer-readable media as clause N describes, wherein the instructions cause the one or more processors to perform operations comprising: determining third semantic data associated with the first variable and the second variable based on the input from the user relating to the first variable and the input from the user relating to the second variable, wherein the third semantic data is different from the first semantic data and the second semantic data; and causing a third lock to be implemented for the first portion based on the third semantic data, wherein the third lock indicates that users other than the first user are to be prevented from making changes to a third set of variables of the first portion that are associated with the third semantic data, the third set of variables including the first variable and the second variable.

P: One or more non-transitory computer-readable media as any of clauses L to O describe, wherein the instructions cause the one or more processors to perform operations comprising: receiving a value from the first user for changing the first variable of the first portion; determining the first semantic data associated with the first variable; determining that the first user is permitted to make changes to the first set of variables based on the first lock and the first semantic data; and changing the first variable of the first portion based on the value and based on determining that the first user is permitted to make changes to the first set of variables.

Q: One or more non-transitory computer-readable media as any of clauses L to P describe, wherein the input comprises a value for changing the first variable associated with the first portion and wherein the instructions cause the one or more processors to perform operations comprising changing the first variable of the first portion based on the value.

R: One or more non-transitory computer-readable media as clause Q describes, wherein the instructions cause the one or more processors to perform operations comprising: determining that the value corresponds to a change in the first variable that fulfils a predetermined criterion; and determining one or more of the first semantic data or causing the first lock to be implemented based on determining that the value corresponds to a change in the first property that fulfils the predetermined criterion.

S: One or more non-transitory computer-readable media as any of clauses L to R describe, wherein the instructions cause the one or more processors to perform operations comprising: determining, based on the first semantic data, a second road segment of the plurality of road segments that connects to the first road segment; and causing a further lock to be implemented for the second road segment based on the first semantic data, wherein the further lock indicates that users other than the first user are to be prevented from making changes to the first set of variables of the second road segment that are associated with the first semantic data.

T: One or more non-transitory computer-readable media as clause S describes, wherein the instructions cause the one or more processors to perform operations comprising: receiving a value from the first user for changing the first variable of the first road segment; performing a validation process on the first road segment and the second road segment; determining a conflict between the first road segment and the second road segment due to the value of the first variable of the first road segment, based on the validation process; and preventing the first user from making a change to the first variable based on the value until the conflict is resolved.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A system comprising:
one or more processors configured to:
receive a first message from a first computing device, the first message comprising data indicating a road segment of a road network map and a first property of the road segment that to be changed;
determine, based on the first message, a first semantic description associated with the first property, wherein the first semantic description is independent of the road segment;
determine, based at least in part on the first semantic description, an absence of a previous lock associated with the road segment;
store an indication that a first lock is granted to the first computing device for the road segment based on the first semantic description, the first lock permitting changes to be made by the first computing device to properties of the road segment associated with the first semantic description and preventing changes from being made by other computing devices connected to a server other than the first computing device to properties of the road segment associated with the first semantic description;
transmit a return message to the first computing system indicating that the change is permitted and that the first lock is granted;
receive a second message from a second computing device, the second message comprising data indicating the road segment of the road network map and a change to a second property of the road segment;
determine, based on the second property, a second semantic description associated with the second property and which differs from the first semantic description;
determine a difference between the first semantic description and the second semantic description; and
determine, based at least in part on the first lock and the difference, to modify the road segment of the road network map in accordance with the first and second message.

2. The system of claim 1, wherein the one or more processors are further configured to:
receive a third message from a third computing device, the third message comprising data indicating the road segment of the road network map and an additional change to the first property of the road segment;
determine, based on the third message, the first semantic description;
determine that the first lock is granted to the first computing device for the road segment based on the first semantic description; and
transmit, to the third computing device, a return message indicating that the change is prohibited.

3. The system of claim 1, wherein the one or more processors are further configured to:
determine the absence of a lock associated with the road segment and the second semantic description;
store an indication that a second lock is granted to the second computing device for the road segment based on the second semantic description, the second lock permitting changes to be made by the second computing device to properties of the road segment associated with the second semantic description and preventing changes from being made by other computing devices connected to the server to properties of the road segment associated with the second semantic description; and
transmit a return message to the second computing system indicating that the change is permitted and that the second lock is granted.

4. The system of claim 1, wherein the first semantic description comprises one or more of:
a geometric label associated with a dimension of a road segment;
a topological label associated with the arrangement or intersection of a road segment; or
a policy label associated with a description limiting how a vehicle may operate on a road segment.

5. The system of claim 4, wherein the geometric label is associated with properties of the road segment comprising one or more of a coordinate of a control point, a lane width, a number of lanes, a curvature, or a tangent, the topological label is associated with properties of the road segment comprising or more of a connecting road segment, a relationship with another road segment, a start point, or an end point, or the policy label is associated with properties of the road segment comprising one or more of a speed limit, a direction of travel of a lane, a type of lane, a schedule, an association with a road element other than the road segment, a permitted vehicle indicator, a validation status, or an access indicator.

6. A method comprising:
receiving input from a first user relating to a first variable of a first portion of a road network;
determining first semantic data associated with the first variable, the first semantic data independent of the first portion of the road network;
determining the absence of a lock for the first portion based on the first semantic data;
causing a first lock to be implemented for the first portion based on the first semantic data, wherein the first lock indicates that users other than the first user are to be prevented from making changes to a first set of variables of the first portion that are associated with the first semantic data;
receiving input from a second user relating to a second variable of the first portion;
determining second semantic data associated with the second variable based on the input from the second user relating to the second variable, wherein the second semantic data associated with the second variable is different from the first semantic data associated with the first variable;

determining a difference between the first semantic data and the second semantic data; and determining, based at least in part on the first lock and the difference, to modify the first portion in accordance with the input from the first user and the input from the second user.

7. The method of claim 6, comprising:

receiving input from a third user relating to the first variable of the first portion;

determining the first semantic data associated with the first variable based on the input from the third user;

determining that the first lock is implemented for the first portion based on the first semantic data; and preventing the third user from making a change to the first variable based on determining that the first lock is implemented for the first portion based on the first semantic data.

8. The method of claim 6, comprising:

receiving input from the first user relating to a third variable of the first portion;

determining third semantic data associated with the third variable based on the input from the first user relating to the third variable, wherein the semantic data associated with the third variable is different from the semantic data associated with the first variable;

determining the absence of a lock for the first portion based on the third semantic data; and causing a second lock to be implemented for the first portion based on the third semantic data, wherein the second lock indicates that users other than the first user are to be prevented from making changes to a second set of variables of the first portion that are associated with the third semantic data.

9. The method of claim 8, comprising:

determining third fourth semantic data associated with the first variable and the third variable based on the input from the first user relating to the first variable and the input from the first user relating to the third variable, wherein the third fourth semantic data is different from the first semantic data and the third semantic data;

determining the absence of a lock for the first portion based on the third fourth semantic data; and causing a third lock to be implemented for the first portion based on the third fourth semantic data, wherein the third lock indicates that users other than the first user are to be prevented from making changes to a third set of variables of the first portion that are associated with the third fourth semantic data, the third set of variables including the first variable and the third variable.

10. The method of claim 6, comprising:

making a change to the first variable of the first portion in a copy of the road network map at a first computing device associated with the first user based on the input; and storing the change at a remote computing device connected to the first computing device and a second computing device associated with a second user.

11. The method of claim 6 comprising:

receiving, at a remote computing device connected to a first computing device associated with a first user and a second computing device associated with the second user, a value from the first computing device for changing the first variable of the first portion; and changing, at the remote computing device, the first variable of the first portion in the road network map based on the value.

12. One or more non-transitory computer-readable media storing instructions executable by one or more processors, wherein the instructions, when executed, cause the one or more processors to perform operations comprising:

receiving first input from a first user relating to a first variable of a first portion of a road network;

determining first semantic data associated with the first variable, the first semantic data independent of the first portion;

causing a first lock to be implemented for the first portion based on the first semantic data, wherein the first lock indicates that users other than the first user are to be prevented from making changes to a first set of variables of the first portion that are associated with the first semantic data;

receiving second input from a second user relating to a second variable of the first portion;

determining second semantic data associated with the second variable based on the input from the second user relating to the second variable, wherein the second semantic data associated with the second variable is different from the first semantic data associated with the first variable; and modifying, based at least in part on the first lock, the first semantic data, and the second semantic data, the first portion of the road network in accordance with the first and second input.

13. The one or more non-transitory computer-readable media of claim 12, wherein the instructions cause the one or more processors to perform operations comprising:

receiving input from a third user relating to the first variable of the first portion;

determining the first semantic data associated with the first variable based on the input from the third user;

determining that the first lock is implemented for the first portion based on the first semantic data; and preventing the third user from making a change to the first variable based on determining that the first lock is implemented for the first portion based on the first semantic data.

14. The one or more non-transitory computer-readable media of claim 12, wherein the instructions cause the one or more processors to perform operations comprising:

receiving input from the first user relating to a third variable of the first portion;

determining third semantic data associated with the third variable based on the input from the first user relating to the third variable, wherein the semantic data associated with the third variable is different from the semantic data associated with the first variable; and causing a second lock to be implemented for the first portion based on the third semantic data, wherein the second lock indicates that users other than the first user are to be prevented from making changes to a second set of variables of the first portion that are associated with the third semantic data.

15. The one or more non-transitory computer-readable media of claim 14, wherein the instructions cause the one or more processors to perform operations comprising:

determining fourth semantic data associated with the first variable and the third variable based on the input from the first user relating to the first variable and the input from the first user relating to the third variable, wherein the third fourth semantic data is different from the first semantic data and the third semantic data;

determining the absence of a lock for the first portion based on the third fourth semantic data; and causing a third lock to be implemented for the first portion based on the fourth semantic data, wherein the third lock indicates that users other than the first user are to be prevented from making changes to a third set of variables of the first portion that are associated with the fourth semantic data, the fourth set of variables including the first variable and the third variable.

16. The one or more non-transitory computer-readable media of claim 12, wherein the instructions cause the one or more processors to perform operations comprising:

receiving a value from the first user for changing the first variable of the first portion;

determining the first semantic data associated with the first variable;

determining that the first user is permitted to make changes to the first set of variables based on the first lock and the first semantic data; and changing the first variable of the first portion based on the value and based on determining that the first user is permitted to make changes to the first set of variables.

17. The one or more non-transitory computer-readable media of claim 12, wherein the input comprises a value for changing the first variable associated with the first portion and wherein the instructions cause the one or more processors to perform operations comprising changing the first variable of the first portion based on the value.

18. The one or more non-transitory computer-readable media of claim 17, wherein the instructions cause the one or more processors to perform operations comprising:

determining that the value corresponds to a change in the first variable that fulfils a predetermined criterion; and determining one or more of the first semantic data or causing the first lock to be implemented based on determining that the value corresponds to a change in the first property that fulfils the predetermined criterion.

19. The one or more non-transitory computer-readable media of claim 12, wherein the instructions cause the one or more processors to perform operations comprising:

determining, based on the first semantic data, a second road segment of the plurality of road segments that connects to the first road segment; and causing a further lock to be implemented for the second road segment based on the first semantic data, wherein the further lock indicates that users other than the first user are to be prevented from making changes to the first set of variables of the second road segment that are associated with the first semantic data.

20. The one or more non-transitory computer-readable media of claim 19, wherein the instructions cause the one or more processors to perform operations comprising:

receiving a value from the first user for changing the first variable of the first road segment;

performing a validation process on the first road segment and the second road segment;

determining a conflict between the first road segment and the second road segment due to the value of the first variable of the first road segment, based on the validation process; and preventing the first user from making a change to the first variable based on the value until the conflict is resolved.

* * * * *